(12) United States Patent
Huang et al.

(10) Patent No.: US 9,893,782 B2
(45) Date of Patent: Feb. 13, 2018

(54) DATA PROCESSING APPARATUS AND DATA PROCESSING METHOD

(71) Applicant: Huawei Technologies Co., Ltd., Shenzhen (CN)

(72) Inventors: Lei Huang, Shanghai (CN); Dageng Chen, Shanghai (CN); Xiaoyan Bi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/444,609

(22) Filed: Feb. 28, 2017

(65) Prior Publication Data
US 2017/0170887 A1 Jun. 15, 2017

Related U.S. Application Data

(63) Continuation of application No. PCT/CN2014/085633, filed on Aug. 30, 2014.

(51) Int. Cl.
*H04B 7/06* (2006.01)
*H04B 7/0413* (2017.01)
*H04L 27/26* (2006.01)

(52) U.S. Cl.
CPC ............. *H04B 7/06* (2013.01); *H04B 7/0413* (2013.01); *H04L 27/2626* (2013.01)

(58) Field of Classification Search
CPC ...... H04B 7/06; H04B 7/0413; H04L 27/2626
See application file for complete search history.

(56) References Cited

U.S. PATENT DOCUMENTS

| 2008/0232489 A1* | 9/2008 | Tsai .................. H04L 1/0071 375/260 |
| 2010/0034312 A1 | 2/2010 | Muharemovic et al. |
| 2010/0239040 A1* | 9/2010 | Beluri ................ H04B 7/0417 375/267 |
| 2011/0142001 A1* | 6/2011 | Ko ..................... H04B 7/0678 370/329 |

FOREIGN PATENT DOCUMENTS

| CN | 101431357 A | 5/2009 |
| CN | 102150378 A | 8/2011 |
| CN | 102201899 A | 9/2011 |
| WO | 2010093194 A2 | 8/2010 |

* cited by examiner

*Primary Examiner* — Jaison Joseph
(74) *Attorney, Agent, or Firm* — Slater Matsil, LLP

(57) ABSTRACT

A data processing apparatus and a data processing method are provided. The method includes inputting q data streams, where each data stream includes $M_{symb}$ complex-valued modulation symbols of one code word, and q and $M_{symb}$ are integers greater than or equal to 1. The method also includes determining an l×l matrix used by the $M_{symb}$ complex-valued modulation symbols included in each data stream, where the l×l matrix is one of an l×l identity matrix and a circulant matrix of the l×l identity matrix, and l is a quantity of transport layers. Additionally, the method includes performing, by using the determined l×l matrix, layer permutation mapping on the $M_{symb}$ complex-valued modulation symbols included in each data stream.

17 Claims, 4 Drawing Sheets

US 9,893,782 B2

DATA PROCESSING APPARATUS AND DATA PROCESSING METHOD

CROSS-REFERENCE TO RELATED APPLICATIONS

This application is a continuation of International Application No. PCT/CN2014/085633, filed on Aug. 30, 2014, the disclosure of which is hereby incorporated by reference in its entirety.

TECHNICAL FIELD

The present embodiments relate to the field of wireless communications technologies, and in particular, to a data processing apparatus and a data processing method.

BACKGROUND

To resolve non-ideal characteristic problems such as channel fading and intercode interference in a wireless communications system, a multiple-input multiple-output (MIMO for short) technology and an orthogonal frequency division multiplexing (OFDM for short) technology are widely used. In the MIMO technology, an array gain, multiplexing and diversity gains, and a co-channel interference reduction gain in space can be obtained for a signal by using resources of space dimensions without increasing system bandwidth, so that a communications system capacity and spectral efficiency are improved.

The MIMO technology is classified into low dimensional MIMO and high dimensional MIMO (HD-MIMO for short). An HD-MIMO technology further improves a system capacity by increasing a quantity of antennas at receive and transmit ends.

Currently, a data transmission process based on the MIMO technology includes: partitioning a transport block (TB for short) into multiple code blocks (CB for short), separately performing channel encoding, scrambling, and modulation on each CB, then performing layer mapping processing, and performing precoding processing, resource mapping, and OFDM modulation, so as to generate multiple carriers. In the layer mapping processing step, a data stream is generally mapped to multiple transport layers in a serial-to-parallel conversion manner. Because multiple channels have different transmission characteristics, the generated multiple carriers undergo different fading. After receiving the multiple carriers that undergo different fading, a receive end can restore data sent by a transmit end.

When the prior art is used in a low dimensional MIMO system, after a data stream of a single code word is mapped to multiple transport layers in a serial-to-parallel conversion manner, data of the code word is centrally in a small resource element (RE for short).

If the prior art is used in an HD-MIMO system, data of a code word is mapped to an adjacent RE. A time-frequency channel of the adjacent RE generally falls within coherence time and coherence bandwidth, and it is considered that the channels are nearly unchanged; therefore, enough time-frequency spatial diversity gain cannot be obtained.

It can be learned that, when resource mapping is performed on a code word in the prior art in the HD-MIMO system, a resource to which the code word is mapped has relatively strong coherence; therefore, enough time-frequency spatial diversities cannot be obtained. In this case, a solution is urgently required.

SUMMARY

Embodiments provide a data processing apparatus and a data processing method, to improve a time-frequency spatial diversity gain, and further improve system transmission efficiency.

According to a first aspect, a data processing apparatus is provided, including a data input module, configured to input q data streams, where each data stream includes $M_{symb}$ complex-valued modulation symbols, and q and $M_{symb}$ are integers greater than or equal to 1 and. The data processing also includes a mapping module, configured to determine an l×l matrix used by the $M_{symb}$ complex-valued modulation symbols included in each data stream, where the l×l matrix is one of an l×l identity matrix and a circulant matrix of the l×l identity matrix, and l is a quantity of transport layers; and perform, by using the determined l×l matrix, mapping on the $M_{symb}$ complex-valued modulation symbols included in each data stream.

With reference to the first aspect, in a first possible implementation manner of the first aspect, the mapping module is specifically configured to: determine, for the $M_{symb}$ complex-valued modulation symbols included in each data stream and according to frequency-domain information, or time-domain information, or time-frequency information corresponding to the complex-valued modulation symbols, an index number of the l×l matrix used by the complex-valued modulation symbols.

With reference to the first possible implementation manner of the first aspect, in a second possible implementation manner of the first aspect, the mapping module is specifically configured to: determine, for the $M_{symb}$ complex-valued modulation symbols included in each data stream and according to the following formula, the index number of the l×l matrix used by the complex-valued modulation symbols:

$$j = \left\lceil \frac{i}{g} \right\rceil \bmod l$$

or $$j = \left\lfloor \frac{i}{g} \right\rfloor \bmod l;$$

where
j indicates an index number of an l×l matrix used by a complex-valued modulation symbol whose index number is i, i indicates the index number of the complex-valued modulation symbol, g indicates a quantity of resource elements included in one resource group, $\lceil \bullet \rceil$ indicates rounding up, $\lfloor \bullet \rfloor$ indicates rounding down, and mod indicates a modulo operation.

With reference to the first possible implementation manner of the first aspect, in a third possible implementation manner of the first aspect, the mapping module is specifically configured to: determine, for the $M_{symb}$ complex-valued modulation symbols included in each data stream and according to the following formula, the index number of the l×l matrix used by the complex-valued modulation symbols:

$j = i \bmod l$; where j indicates an index number of an l×l matrix used by a complex-valued modulation symbol whose index number is i, i indicates the index number of the complex-valued modulation symbol, and mod indicates a modulo operation.

With reference to the first possible implementation manner of the first aspect, in a fourth possible implementation manner of the first aspect, the mapping module is specifically configured to: determine, for the $M_{symb}$ complex-valued modulation symbols included in each data stream and according to the following formula, the index number of the l×l matrix used by the complex-valued modulation symbols:

$j = t_i \bmod l$; where j indicates an index number of an l×l matrix used by a complex-valued modulation symbol whose index number is i, $t_i$ indicates an index number of a time-domain resource to which the complex-valued modulation symbol whose index number is i is mapped, and mod indicates a modulo operation.

With reference to the first possible implementation manner of the first aspect, in a fifth possible implementation manner of the first aspect, the mapping module is specifically configured to determine, for the $M_{symb}$ complex-valued modulation symbols included in each data stream and according to the following formula, the index number of the l×l matrix used by the complex-valued modulation symbols:

$$j = \left(\left\lceil \frac{i}{g} \right\rceil + t_i\right) \bmod l$$

or $$j = \left(\left\lfloor \frac{i}{g} \right\rfloor + t_i\right) \bmod l;$$

where
j indicates an index number of an l×l matrix used by a complex-valued modulation symbol whose index number is i, i indicates the index number of the complex-valued modulation symbol, g indicates a quantity of resource elements included in one resource group, $\lceil \bullet \rceil$ indicates rounding up, $\lfloor \bullet \rfloor$ indicates rounding down, $t_1$ indicates an index number of a time-domain resource to which the complex-valued modulation symbol whose index number is i is mapped, and mod indicates a modulo operation.

With reference to any one of the first aspect, or the first to the fifth possible implementation manners of the first aspect, in a sixth possible implementation manner of the first aspect, the data input module is further configured to: partition a transport block scheduled in one scheduling period into q sub transport blocks; separately partition the q sub transport blocks and add cyclic redundancy check (CRC) codes to the q sub transport blocks to obtain q code blocks, where the transport block is a data packet scheduled by a Media Access Control (MAC) layer; and separately encode the q code blocks to obtain the q code words, where the q code words are in a one-to-one correspondence with the q data streams.

With reference to the sixth possible implementation manner of the first aspect, in a seventh possible implementation manner of the first aspect, the data input module is specifically configured to: if one transport block is scheduled in one scheduling period, partition the transport block into q sub transport blocks; or if Y transport blocks are scheduled in one scheduling period, partition one of the Y transport blocks into Y1 sub transport blocks, and use each remaining transport block as one sub transport block, where Y1=q−Y+1, and Y is an integer greater than 1 and less than or equal to q.

According to a second aspect, a data processing method is provided, including inputting q data streams, where each data stream includes $M_{symb}$ complex-valued modulation symbols of one code word, and q and $M_{symb}$ are integers greater than or equal to 1. The method also includes determining an l×l matrix used by the $M_{symb}$ complex-valued modulation symbols included in each data stream, where the l×l matrix is one of an l×l identity matrix and a circulant matrix of the l×l identity matrix, and l is a quantity of transport layers; and performing, by using the determined l×l matrix, layer permutation mapping on the $M_{symb}$ complex-valued modulation symbols included in each data stream.

With reference to the second aspect, in a first possible implementation manner of the second aspect, the determining an l×l matrix used by the $M_{symb}$ complex-valued modulation symbols included in each data stream includes determining, for the $M_{symb}$ complex-valued modulation symbols included in each data stream and according to frequency-domain information, or time-domain information, or time-frequency information corresponding to the complex-valued modulation symbols, an index number of the l×l matrix used by the complex-valued modulation symbols.

With reference to the first possible implementation manner of the second aspect, in a second possible implementation manner of the second aspect, the determining an l×l matrix used by the $M_{symb}$ complex-valued modulation symbols included in each data stream includes: determining, for the Msymb complex-valued modulation symbols included in each data stream and according to the following formula, the index number of the l×l matrix used by the complex-valued modulation symbols:

$$j = \left\lceil \frac{i}{g} \right\rceil \bmod l$$

or $$j = \left\lfloor \frac{i}{g} \right\rfloor \bmod l;$$

where
j indicates an index number of an l×l matrix used by a complex-valued modulation symbol whose index number is i, i indicates the index number of the complex-valued modulation symbol, g indicates a quantity of resource elements included in one resource group, $\lceil \bullet \rceil$ indicates rounding up, $\lfloor \bullet \rfloor$ indicates rounding down, and mod indicates a modulo operation.

With reference to the first possible implementation manner of the second aspect, in a third possible implementation manner of the second aspect, the mapping module is specifically configured to: determine, for the $M_{symb}$ complex-valued modulation symbols included in each data stream and according to the following formula, the index number of the l×l matrix used by the complex-valued modulation symbols:

$j = i \bmod l$; where j indicates an index number of an l×l matrix used by a complex-valued modulation symbol whose index number is i, i indicates the index number of the complex-valued modulation symbol, and mod indicates a modulo operation.

With reference to the first possible implementation manner of the second aspect, in a fourth possible implementation manner of the second aspect, the determining an l×l matrix used by the $M_{symb}$ complex-valued modulation symbols included in each data stream includes: determining, for the $M_{symb}$ complex-valued modulation symbols included in each data stream and according to the following formula, the index number of the l×l matrix used by the complex-valued modulation symbols:

$j = t_i \bmod l$; where j indicates an index number of an l×l matrix used by a complex-valued modulation symbol whose index number is i, $t_i$ indicates an index number of a time-domain resource to which the complex-valued modulation symbol whose index number is i is mapped, and mod indicates a modulo operation.

With reference to the first possible implementation manner of the second aspect, in a fifth possible implementation manner of the second aspect, the determining an l×l matrix used by the $M_{symb}$ complex-valued modulation symbols included in each data stream includes: determining, for the $M_{symb}$ complex-valued modulation symbols included in each data stream and according to the following formula, the index number of the l×l matrix used by the complex-valued modulation symbols:

$$j = \left(\left\lceil \frac{i}{g} \right\rceil + t_i\right) \bmod l$$

or $$j = \left(\left\lfloor \frac{i}{g} \right\rfloor + t_i\right) \bmod l;$$

where
j indicates an index number of an l×l matrix used by a complex-valued modulation symbol whose index number is i, i indicates the index number of the complex-valued modulation symbol, g indicates a quantity of resource elements included in one resource group, $\lceil \bullet \rceil$ indicates rounding up, $\lfloor \bullet \rfloor$ indicates rounding down, $t_i$ indicates an index number of a time-domain resource to which the complex-valued modulation symbol whose index number is i is mapped, and mod indicates a modulo operation.

With reference to any one of the second aspect, or the first to the fifth possible implementation manners of the second aspect, in a sixth possible implementation manner of the second aspect, before the processing q code words to obtain the q data streams, the method further includes: partitioning a transport block scheduled in one scheduling period into q sub transport blocks, and separately partitioning the q sub transport blocks and adding CRC codes to the q sub transport blocks to obtain q code blocks, where the transport block is a data packet scheduled by a MAC layer; and separately encoding the q code blocks to obtain the q code words, where the q code words are in a one-to-one correspondence with the q data streams.

With reference to the sixth possible implementation manner of the second aspect, in a seventh possible implementation manner, the partitioning a transport block scheduled in one scheduling period into q sub transport blocks includes: if one transport block is scheduled in one scheduling period, partitioning the transport block into q sub transport blocks; or if Y transport blocks are scheduled in one scheduling period, partitioning one of the Y transport blocks into Y1 sub transport blocks, and using each remaining transport block as one sub transport block, where Y1=q−Y+1, and Y is an integer greater than 1 and less than or equal to q.

According to a third aspect, a data processing apparatus is provided, including a processor and a memory; where the memory stores one or more executable programs, which are used to configure the processor; and the processor is configured with the one or more executable programs, where the one or more executable programs are used to execute the following method: inputting q data streams, where each data stream includes $M_{symb}$ complex-valued modulation symbols, and q and $M_{symb}$ are integers greater than or equal to 1; and determining an l×l matrix used by the $M_{symb}$ complex-valued modulation symbols included in each data stream, where the l×l matrix is one of an l×l identity matrix and a circulant matrix of the l×l identity matrix, and l is a quantity of transport layers; and performing, by using the determined l×l matrix, mapping on the $M_{symb}$ complex-valued modulation symbols included in each data stream.

With reference to the third aspect, in a first possible implementation manner of the third aspect, the processor is specifically configured to: determine, for the $M_{symb}$ complex-valued modulation symbols included in each data stream and according to frequency-domain information, or time-domain information, or time-frequency information corresponding to the complex-valued modulation symbols, an index number of the l×l matrix used by the complex-valued modulation symbols.

With reference to the first possible implementation manner of the third aspect, in a second possible implementation manner of the third aspect, the processor is specifically configured to: determine, for the $M_{symb}$ complex-valued modulation symbols included in each data stream and according to the following formula, the index number of the l×l matrix used by the complex-valued modulation symbols:

$$j = \left\lceil \frac{i}{g} \right\rceil \bmod l$$

or $$j = \left\lfloor \frac{i}{g} \right\rfloor \bmod l;$$

where
j indicates an index number of an l×l matrix used by a complex-valued modulation symbol whose index number is i, i indicates the index number of the complex-valued modulation symbol, g indicates a quantity of resource elements included in one resource group, $\lceil \bullet \rceil$ indicates rounding up, $\lfloor \bullet \rfloor$ indicates rounding down, and mod indicates a modulo operation.

With reference to the first possible implementation manner of the third aspect, in a third possible implementation manner of the third aspect, the processor is specifically configured to: determine, for the $M_{symb}$ complex-valued modulation symbols included in each data stream and according to the following formula, the index number of the l×l matrix used by the complex-valued modulation symbols:

$$j = i \bmod l; \text{ where}$$

j indicates an index number of an l×l matrix used by a complex-valued modulation symbol whose index number is i, i indicates the index number of the complex-valued modulation symbol, and mod indicates a modulo operation.

With reference to the first possible implementation manner of the third aspect, in a fourth possible implementation manner of the third aspect, the processor is specifically configured to: determine, for the $M_{symb}$ complex-valued modulation symbols included in each data stream and according to the following formula, the index number of the l×l matrix used by the complex-valued modulation symbols:

$$j = t_i \bmod l; \text{ where}$$

j indicates an index number of an l×l matrix used by a complex-valued modulation symbol whose index number is i, $t_i$ indicates an index number of a time-domain resource to which the complex-valued modulation symbol whose index number is i is mapped, and mod indicates a modulo operation.

With reference to the first possible implementation manner of the third aspect, in a fifth possible implementation manner of the third aspect, the processor is specifically configured to: determine, for the $M_{symb}$ complex-valued modulation symbols included in each data stream and according to the following formula, the index number of the l×l matrix used by the complex-valued modulation symbols:

$$j = \left(\left\lceil \frac{i}{g} \right\rceil + t_i\right) \bmod l$$

or $$j = \left(\left\lfloor \frac{i}{g} \right\rfloor + t_i\right) \bmod l;$$

where
j indicates an index number of an l×l matrix used by a complex-valued modulation symbol whose index number is i, i indicates the index number of the complex-valued modulation symbol, g indicates a quantity of resource elements included in one resource group, $\lceil \bullet \rceil$ indicates rounding up, $\lfloor \bullet \rfloor$ indicates rounding down, $t_i$ indicates an index number of a time-domain resource to which the complex-valued modulation symbol whose index number is i is mapped, and mod indicates a modulo operation.

With reference to any one of the third aspect, or the first to the fifth possible implementation manners of the third aspect, in a sixth possible implementation manner of the third aspect, the data processor is further configured to: partition a transport block scheduled in one scheduling period into q sub transport blocks; separately partition the q sub transport blocks and add CRC codes to the q sub transport blocks to obtain q code blocks, where the transport block is a data packet scheduled by a MAC layer; and separately encode the q code blocks to obtain the q code words, where the q code words are in a one-to-one correspondence with the q data streams.

With reference to the sixth possible implementation manner of the third aspect, in a seventh possible implementation manner of the third aspect, the processor is specifically configured to: if one transport block is scheduled in one scheduling period, partition the transport block into q sub transport blocks; or if Y transport blocks are scheduled in one scheduling period, partition one of the Y transport blocks into Y1 sub transport blocks, and use each remaining transport block as one sub transport block, where Y1=q−Y+1, and Y is an integer greater than 1 and less than or equal to q.

In the embodiments, an l×l matrix used by $M_{symb}$ complex-valued modulation symbols of each data stream is separately determined, and mapping is performed on the $M_{symb}$ complex-valued modulation symbols of each data stream by using the determined l×l matrix. Because the l×l matrix is one of an l×l identity matrix and a circulant matrix of the l×l identity matrix, $M_{symb}$ complex-valued modulation symbols of a data stream are separately mapped to different transport layers according to an arrangement rule of elements in the matrix by using such an l×l matrix, so that the $M_{symb}$ complex-valued modulation symbols of the data stream are scattered at multiple transport layers. Therefore, a time-frequency diversity is obtained by means of channel encoding, and a spatial diversity gain is further obtained for each data stream, thereby increasing a time-frequency spatial diversity gain, and further improving system transmission efficiency.

BRIEF DESCRIPTION OF THE DRAWINGS

To describe the technical solutions in the embodiments more clearly, the following briefly describes the accompanying drawings required for describing the embodiments. Apparently, the accompanying drawings in the following description show merely some embodiments, and a person of ordinary skill in the art may still derive other drawings from these accompanying drawings without creative efforts.

DETAILED DESCRIPTION OF ILLUSTRATIVE EMBODIMENTS

Figure 1:
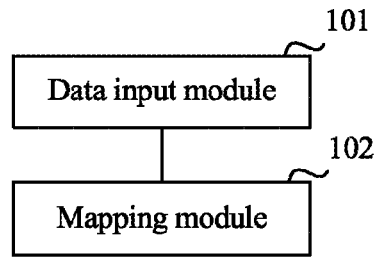
FIG. 1 is a schematic structural diagram of a data processing apparatus according to an embodiment.

In embodiments, an l×l matrix used by $M_{symb}$ complex-valued modulation symbols of each data stream is separately determined, and layer permutation mapping is performed on the $M_{symb}$ complex-valued modulation symbols of each data stream by using the determined l×l matrix. Because the l×l matrix is one of an l×l identity matrix and a circulant matrix of the l×l identity matrix, $M_{symb}$ complex-valued modulation symbols of a data stream are separately mapped to different transport layers according to an arrangement rule of elements in the matrix by using such an l×l matrix, so that the $M_{symb}$ complex-valued modulation symbols of the data stream are scattered at multiple transport layers. Therefore, a time-frequency diversity is obtained by means of channel encoding, and a spatial diversity gain is further obtained for each data stream, thereby increasing a time-frequency spatial diversity gain, and further improving system transmission efficiency.

A complex-valued modulation symbol described in the embodiments is a symbol formed by means of modulation, and is specifically represented as complex-valued data. For example, by means of quadrature phase shift keying (QPSK) modulation, 2-bit information can be mapped to complex-valued data first in a frequency domain and then in a time domain; if 64 quadrature amplitude modulation (QAM) modulation is used, 6-bit information can be mapped to complex-valued data first in a frequency domain and then in a time domain. Therefore, there is frequency-domain information in the complex-valued modulation symbol.

An identity matrix is a square matrix whose diagonal from an upper left corner to a lower right corner is referred to as a main diagonal. All elements on the main diagonal are 1, while elements are o elsewhere. For example, a 4×4 identity matrix may be represented as:

$$D = \begin{bmatrix} 1 & 0 & 0 & 0 \\ 0 & 1 & 0 & 0 \\ 0 & 0 & 1 & 0 \\ 0 & 0 & 0 & 1 \end{bmatrix}.$$

Each element of a row vector of a circulant matrix is obtained after each element of a previous row vector is sequentially moved one position rightwards. For example, a 4×4 identity matrix and circulant matrices of the identity matrix are four matrices in total, where $D_0$ is an identity matrix, $D_1$ is a circulant matrix obtained after all row elements in $D_0$ are simultaneously and cyclically moved one position rightwards, $D_2$ is a circulant matrix obtained after all row elements in $D_1$ are simultaneously and cyclically moved one position rightwards, and $D_3$ is a circulant matrix obtained after all row elements in $D_2$ are simultaneously and cyclically moved one position rightwards.

$$D_0 = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

$$D_1 = \begin{bmatrix} 0 & 1 & 0 & 0 \\ 0 & 0 & 1 & 0 \\ 0 & 0 & 0 & 1 \\ 1 & 0 & 0 & 0 \end{bmatrix}$$

$$D_2 = \begin{bmatrix} 0 & 0 & 1 & 0 \\ 0 & 0 & 0 & 1 \\ 1 & 0 & 0 & 0 \\ 0 & 1 & 0 & 0 \end{bmatrix}$$

$$D_3 = \begin{bmatrix} 0 & 0 & 0 & 1 \\ 1 & 0 & 0 & 0 \\ 0 & 1 & 0 & 0 \\ 0 & 0 & 1 & 0 \end{bmatrix}$$

To make the objectives, technical solutions, and advantages of the present embodiments clearer, the following further describes the present embodiments in detail with reference to the accompanying drawings. Apparently, the described embodiments are merely some but not all of the embodiments. All other embodiments obtained by a person of ordinary skill in the art based on the embodiments of the present embodiments without creative efforts shall fall within the protection scope of the present embodiments.

The following description is based on an architecture in which a 3rd Generation Partnership Project Long Term Evolution (3GPP LTE for short) network is used as a cellular network. However, a method and a device that are provided in the embodiments are not limited to the architecture in which the 3GPPP LTE network is used as the cellular network, but also applied to another network architecture, for example, a network architecture in which a cellular network with wide area coverage (such as WiMAX) coexists with millimeter-wave cellular communications.

Referring to FIG. 1, FIG. 1 is a schematic structural diagram of a data processing apparatus according to an embodiment. The apparatus may be a device having a cellular network communication function, such as a base station or a mobile terminal, or may be a transmitter in these devices.

Figure 2:
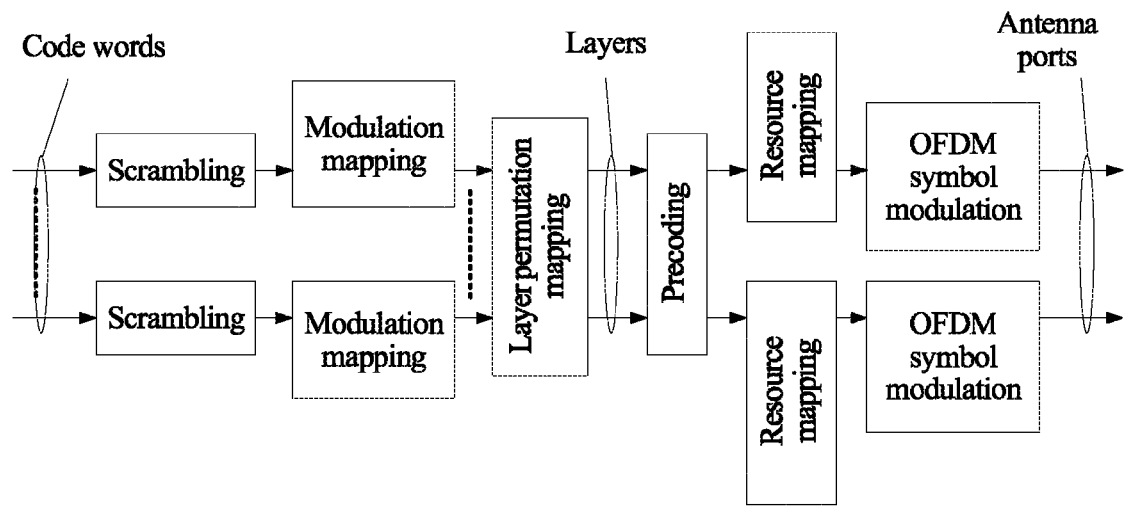
FIG. 2 is a schematic diagram of a data processing process according to an embodiment.

A data processing process involved in this embodiment is shown in FIG. 2, and may include: partitioning a transport block into code blocks, separately performing channel encoding on each code block to form code words, separately performing layer permutation mapping after processing such as scrambling and modulation mapping is performed on each code word, and then performing precoding processing, resource mapping, symbol modulation such as OFDM symbol modulation, and the like, so as to obtain multiple carriers and transmit the multiple carriers by using antenna ports.

In the data processing apparatus shown in FIG. 1, a structure related to a layer permutation mapping processing operation in the foregoing data processing process may include a data input module 101 and a mapping module 102.

The data input module 101 is configured to input q data streams, where each data stream includes $M_{symb}$ complex-valued modulation symbols of one code word, and q and $M_{symb}$ are integers greater than or equal to 1.

The mapping module 102 is configured to: determine an l×l matrix used by the $M_{symb}$ complex-valued modulation symbols included in each data stream, where the l×l matrix is one of an l×l identity matrix and a circulant matrix of the l×l identity matrix, and l is a quantity of transport layers; and perform, by using the determined l×l matrix, the layer permutation mapping on the $M_{symb}$ complex-valued modulation symbols included in each data stream.

Preferably, the data input module 101 may perform processing such as encoding, scrambling, and modulation on q code words to obtain the q data streams. Each data stream is corresponding to one code word, and a data stream corresponding to each code word includes $M_{symb}$ complex-valued modulation symbols of the code word. Encoding such as repetition encoding, spread spectrum encoding, or channel encoding and modulation such as QPSK or quadrature amplitude modulation (QAM for short) are performed on a code word to obtain multiple complex-valued modulation symbols of the code word.

The code word herein may also be referred to as a bit data block. After channel encoding is performed on a code block, an encoded code block is formed. Bit data of a corresponding size is extracted from the foregoing encoded code block according to a size of a scheduling resource, to form the code word. For example, a length of a code block is N bits, and a length of an encoded code block is 3N bits. If M REs need to be scheduled, and quadrature phase shift keying (QPSK for short) modulation is used, a corresponding quantity of bits is 2M. 2M bits are extracted from the foregoing encoded code block whose length is 3N, to form the foregoing code word. Preferably, the mapping module 102 may determine, in multiple manners, the l×l matrix used by the $M_{symb}$ complex-valued modulation symbols included in each data stream. The l×l matrix is an element in a matrix set, where the matrix set includes one l×l identity matrix and (l−1) circulant matrices obtained by performing cyclic shift based on the identity matrix, such as the foregoing $D_0$ to $D_3$. When determining the l×l matrix used by the $M_{symb}$ complex-valued modulation symbols included in each data stream, the mapping module 102 may select, in a polling manner, a matrix from the matrix set for a complex-valued modulation symbol to which an l×l identity matrix currently needs to be allocated.

For the $M_{symb}$ complex-valued modulation symbols included in each data stream, an index number of the l×l matrix used by the complex-valued modulation symbols may be determined according to frequency-domain information, or time-domain information, or time-frequency information corresponding to the complex-valued modulation symbols.

To simplify technical implementation, preferably, the mapping module 102 may determine, in one of the following manner 1 to the following manner 3, the l×l matrix used by the $M_{symb}$ complex-valued modulation symbols included in each data stream.

Manner 1.

The mapping module 102 may determine, for the $M_{symb}$ complex-valued modulation symbols included in each data stream and according to a formula (1) or a formula (2), the index number of the l×l matrix used by the complex-valued modulation symbols:

$$j = \left\lceil \frac{i}{g} \right\rceil \bmod l \qquad (1)$$

$$j = \left\lfloor \frac{i}{g} \right\rfloor \bmod l; \qquad (2)$$

where j indicates an index number of an l×l matrix used by a complex-valued modulation symbol whose index number is i, i indicates the index number of the complex-valued modulation symbol, g indicates a quantity of resource elements included in one resource group, ⌈●⌉ indicates rounding up, ⌊●⌋ indicates rounding down, and mod indicates a modulo operation.

Preferably, the mapping module 102 may determine, for the $M_{symb}$ complex-valued modulation symbols included in each data stream and according to a formula (3), the index number of the l×l matrix used by the complex-valued modulation symbols:

$$j = i \bmod l \qquad (3);\text{ where}$$

j indicates an index number of an l×l matrix used by a complex-valued modulation symbol whose index number is i, i indicates the index number of the complex-valued modulation symbol, and mod indicates a modulo operation.

Preferably, when one resource group includes one resource element, the formula (3) is used.

Because the complex-valued modulation symbol is obtained by means of mapping first in a frequency domain and then in a time domain, the index number i of the complex-valued modulation symbol may reflect frequency-domain information. After the index number of the l×l matrix used by the complex-valued modulation symbols is determined in the foregoing manner 1, and after operations of layer permutation mapping and precoding processing are performed, different complex-valued modulation symbols of a same code word may be basically evenly distributed in a frequency domain, so as to obtain a spatial diversity gain.

Manner 2.

As described above, after the layer permutation mapping is performed, data obtained after the layer permutation mapping is mapped to a symbol (for example, an orthogonal frequency division multiplexing technology (OFDM for short) symbol) by means of processing operations such as precoding and symbol modulation.

The mapping module 102 may determine, for the $M_{symb}$ complex-valued modulation symbols included in each data stream and according to a formula (4), the index number of the l×l matrix used by the complex-valued modulation symbols:

$$j = t_i \bmod l \qquad (4);\text{ where}$$

j indicates an index number of an l×l matrix used by a complex-valued modulation symbol whose index number is i, $t_i$ indicates an index number of a time-domain resource to which the complex-valued modulation symbol whose index number is i is mapped, and mod indicates a modulo operation.

Because $t_i$ indicates the index number of the time-domain resource to which the complex-valued modulation symbol whose index number is i is mapped, $t_i$ may reflect time-domain information. After the index number of the l×l matrix used by the complex-valued modulation symbols is determined in the foregoing manner 2, and after operations of layer permutation mapping and precoding processing are performed, different complex-valued modulation symbols of a same code word may be relatively evenly distributed in a time domain, so as to obtain a time-frequency diversity gain.

Manner 3.

With reference to the methods provided in the foregoing manner 1 and manner 2, in the manner 3, the mapping module 102 may determine, for the $M_{symb}$ complex-valued modulation symbols included in each data stream and according to a formula (5) or a formula (6), the index number of the l×l matrix used by the complex-valued modulation symbols:

$$j = \left(\left\lceil \frac{i}{g} \right\rceil + t_i \right) \bmod l \qquad (5)$$

$$j = \left(\left\lfloor \frac{i}{g} \right\rfloor + t_i \right) \bmod l; \qquad (6)$$

where j indicates an index number of an l×l matrix used by a complex-valued modulation symbol whose index number is i, i indicates the index number of the complex-valued modulation symbol, g indicates a quantity of resource elements included in one resource group, ⌈●⌉ indicates rounding up, ⌊●⌋ indicates $t_i$ rounding down, indicates an index number of a time-domain resource to which the complex-valued modulation symbol whose index number is i is mapped, and mod indicates a modulo operation.

After the index number of the l×l matrix used by the complex-valued modulation symbols is determined in the foregoing manner 3, and after operations of layer permutation mapping and precoding processing are performed, different complex-valued modulation symbols of a same code word may be relatively evenly distributed in a frequency domain and in a time domain, so as to obtain a time-frequency diversity gain.

Preferably, the data input module 101 may partition a transport block scheduled in one scheduling period into q sub transport blocks, separately partition the q sub transport blocks and add cyclic redundancy check (CRC for short) codes to the q sub transport blocks to obtain q code blocks, and separately encode the q code blocks to obtain the q code words, where the q code words are in a one-to-one correspondence with the q data streams. The transport block is a data packet scheduled by a Media Access Control (MAC for short) layer.

For example, if one transport block is scheduled in one scheduling period, the data input module 101 may partition the transport block into q sub transport blocks, separately perform processing operations of partitioning the q sub transport blocks and adding CRC codes to the q sub transport blocks to obtain q code blocks, and perform encoding processing on the q code blocks to obtain q code words.

For another example, if Y (1<Y≤q) transport blocks are scheduled in one scheduling period, the data input module 101 may partition one of the Y transport blocks into Y1 (Y1=q−Y+1) sub transport blocks, and use each remaining transport block as one sub transport block, thereby obtaining q sub transport blocks in total; and separately perform processing operations of partitioning the q sub transport blocks and adding CRC codes to the q sub transport blocks to obtain q code blocks, and separately perform encoding processing on the q code blocks to obtain q code words.

The foregoing data processing apparatus may be implemented by hardware, for example, may be implemented by a programmable gate array (FPGA for short) or an application-specific integrated circuit (ASIC for short). Preferably, the foregoing data processing apparatus may alternatively be implemented by software, that is, the foregoing data processing apparatus is an apparatus of a software architecture.

In a case in which the foregoing data processing apparatus is an apparatus of a software architecture, parallel calculation can be implemented better in the software architecture by using a two-level partitioning solution for a transport block, so as to increase a calculation speed and improve a processing capability.

It can be learned from the foregoing description of this embodiment that, because an identity matrix and a circulant matrix of the identity matrix are used to separately map $M_{symb}$ complex-valued modulation symbols of a data stream to different transport layers according to an arrangement rule of elements in the circulant matrix, the $M_{symb}$ complex-valued modulation symbols of the data stream are scattered at multiple transport layers. Therefore, a time-frequency diversity is obtained by means of channel encoding, and a spatial diversity gain is further obtained for each data stream, thereby increasing a time-frequency spatial diversity gain, and further improving system transmission efficiency.

Based on the same concept, an embodiment further provides a data processing apparatus. The apparatus may be a device having a cellular network communication function, such as a base station or a mobile terminal, or may be a transmitter in these devices.

Figure 3:
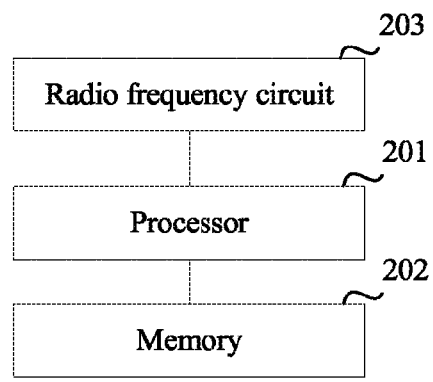
FIG. 3 is a schematic structural diagram of another data processing apparatus according to an embodiment.

As shown in FIG. 3, the data processing apparatus may include a processor 201 and a memory 202, and may further include a radio frequency circuit 203.

The memory 202 stores one or more executable programs, which are used to configure the processor 201. The memory 202 may further store intermediate processing data or a processing result of the processor 201, for example, a complex-valued modulation symbol and a circulant matrix of an identity matrix.

The processor 201 is configured with one or more executable programs, where the one or more executable programs are used to execute the following method: inputting q data streams, where each data stream includes $M_{symb}$ complex-valued modulation symbols of one code word, and q and $M_{symb}$ are integers greater than or equal to 1; determining a circulant matrix of an identity matrix used by the $M_{symb}$ complex-valued modulation symbols included in each data stream, where the identity matrix is an l×l matrix, and l is a quantity of transport layers; and performing, by using the determined l×l matrix, layer permutation mapping on the $M_{symb}$ complex-valued modulation symbols included in each data stream.

Further, the processor 201 may further perform processing such as precoding processing and symbol modulation on data obtained after the layer permutation mapping, so as to obtain multiple carriers and transmit the multiple carriers by using the radio frequency circuit 203.

Preferably, the processor 201 may perform processing such as scrambling and modulation on q code words to obtain the q data streams. Each data stream is corresponding to one code word, and a data stream corresponding to each code word includes $M_{symb}$ complex-valued modulation symbols of the code word. A complex-valued modulation symbol of a code word may also be referred to as a duplicate of the code word. Encoding such as repetition encoding, spread spectrum encoding, or channel encoding is performed on a code word to obtain multiple complex-valued modulation symbols of the code word. A meaning of the code word is described in the foregoing and is not described herein again.

Preferably, the processor 201 may determine, in multiple manners, the l×l matrix used by the $M_{symb}$ complex-valued modulation symbols included in each data stream. The l×l matrix is an element in a matrix set, where the matrix set includes one l×l identity matrix and (l−1) circulant matrices obtained by performing cyclic shift based on the identity matrix, such as the foregoing $D_0$ to $D_3$. When determining the l×l matrix used by the $M_{symb}$ complex-valued modulation symbols included in each data stream, the processor 201 may select, in a polling manner, a matrix from the matrix set for a complex-valued modulation symbol to which an l×l identity matrix currently needs to be allocated.

For the $M_{symb}$ complex-valued modulation symbols included in each data stream, an index number of the l×l matrix used by the complex-valued modulation symbols is determined according to frequency-domain information, or time-domain information, or time-frequency information corresponding to the complex-valued modulation symbols.

To simplify technical implementation, preferably, the processor 201 may determine, in one of the following manner 1 to the following manner 3, the l×l matrix used by the $M_{symb}$ complex-valued modulation symbols included in each data stream.

Manner 1.

The processor 201 may determine, for the $M_{symb}$ complex-valued modulation symbols included in each data stream and according to a formula (1), a formula (2), or a formula (3), the index number of the l×l matrix used by the complex-valued modulation symbols. After the index number of the l×l matrix used by the complex-valued modulation symbols is determined in the foregoing manner 1, and after operations of layer permutation mapping and precoding processing are performed, different complex-valued modulation symbols of a same code word may be basically evenly distributed in a frequency domain, so as to obtain a spatial diversity gain.

Manner 2.

As described above, after the layer permutation mapping is performed, data obtained after the layer permutation mapping is mapped to a symbol (for example, an OFDM symbol) by means of processing operations such as precoding and symbol modulation. The processor 201 determines, for the $M_{symb}$ complex-valued modulation symbols included in each data stream and according to a formula (4), the index number of the l×l matrix used by the complex-valued modulation symbols. After the index number of the l×l matrix used by the complex-valued modulation symbols is determined in the foregoing manner 2, and after operations of layer permutation mapping and precoding processing are performed, different complex-valued modulation symbols of a same code word may be relatively evenly distributed in a time domain, so as to obtain a time-frequency diversity gain.

Manner 3:

With reference to the methods provided in the foregoing manner 1 and manner 2, in the manner 3, the processor 201 determines, for the $M_{symb}$ complex-valued modulation symbols included in each data stream and according to a formula (5) or a formula (6), the index number of the l×l matrix used by the complex-valued modulation symbols. After the index number of the l×l matrix used by the complex-valued modulation symbols is determined in the foregoing manner 3, and after operations of layer permutation mapping and precoding processing are performed, different complex-valued modulation symbols of a same code word may be relatively evenly distributed in a frequency domain and in a time domain, so as to obtain a time-frequency diversity gain.

Preferably, the processor 201 may be further configured to: partition a transport block scheduled in one scheduling period into q sub transport blocks, separately partition the q sub transport blocks and add CRC codes to the q sub transport blocks to obtain q code blocks, and separately encode the q code blocks to obtain the q code words, where the q code words are in a one-to-one correspondence with the q data streams. The transport block is a data packet scheduled by an MAC layer.

For example, if one transport block is scheduled in one scheduling period, the processor 201 may partition the transport block into q sub transport blocks, separately perform processing operations of partitioning the q sub transport blocks and adding CRC codes to the q sub transport blocks to obtain q code blocks, and perform encoding processing on the q code blocks to obtain q code words.

For another example, if Y (1<Y≤q) transport blocks are scheduled in one scheduling period, the processor 201 may partition one of the Y transport blocks into Y1 (Y1=q−Y+1) sub transport blocks, and use each remaining transport block as one sub transport block, thereby obtaining q sub transport blocks in total; and separately perform processing operations of partitioning the q sub transport blocks and adding CRC codes to the q sub transport blocks to obtain q code blocks, and separately perform encoding processing on the q code blocks to obtain q code words.

Parallel calculation can be implemented better in a software architecture by using a two-level partitioning solution for a transport block, so as to increase a calculation speed and improve a processing capability.

It can be learned from the foregoing description of this embodiment that, because an identity matrix and a circulant matrix of the identity matrix are used to separately map $M_{symb}$ complex-valued modulation symbols of a data stream to different transport layers according to an arrangement rule of elements in the circulant matrix, the $M_{symb}$ complex-valued modulation symbols of the data stream are scattered at multiple transport layers. Therefore, a time-frequency diversity is obtained by means of channel encoding, and a spatial diversity gain is further obtained for each data stream, thereby increasing a time-frequency spatial diversity gain, and further improving system transmission efficiency.

Based on the same concept, an embodiment provides a data processing procedure, where the procedure may be implemented by the data processing apparatus shown in FIG. 1 or FIG. 3.

Figure 4:
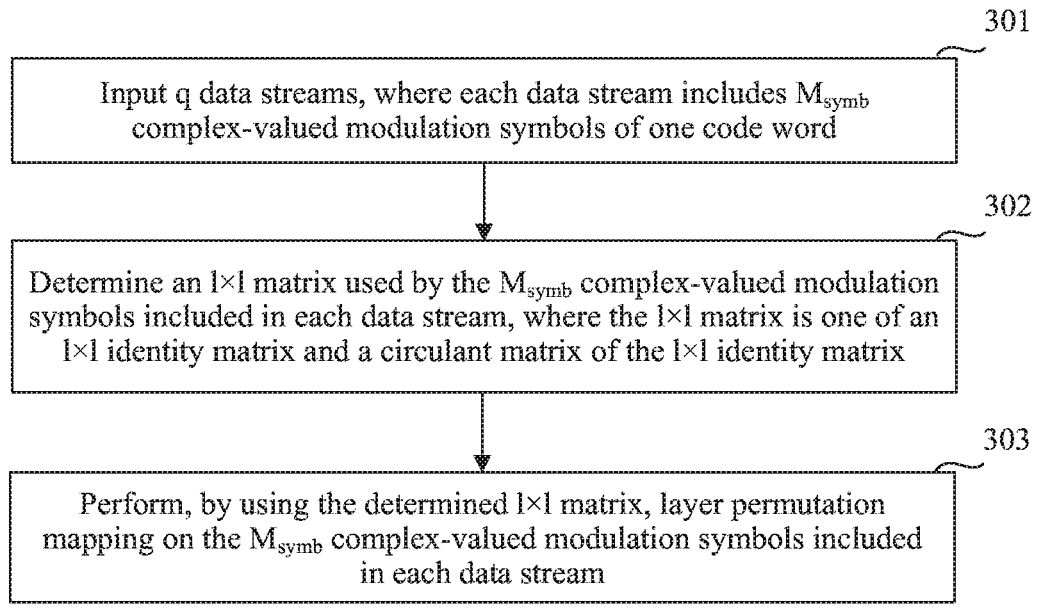
FIG. 4 is a schematic flowchart of a data processing method according to an embodiment.

As shown in FIG. 4, the data processing procedure may include the following steps.

Step 301: Input q data streams, where each data stream includes $M_{symb}$ complex-valued modulation symbols of one code word, and q and $M_{symb}$ are integers greater than or equal to 1. This step may be implemented by the data input module 101 in FIG. 1 or the processor 201 in FIG. 3.

Specifically, in this step, processing such as scrambling and modulation may be performed on q code words to obtain the q data streams. Each data stream is corresponding to one code word, and a data stream corresponding to each code word includes $M_{symb}$ complex-valued modulation symbols of the code word. A complex-valued modulation symbol of a code word may also be referred to as a duplicate of the code word. Encoding such as repetition encoding, spread spectrum encoding, or channel encoding is performed on a code word to obtain multiple complex-valued modulation symbols of the code word.

The code word herein may also be referred to as a bit data block. After channel encoding is performed on a code block, an encoded code block is formed. Bit data of a corresponding size is extracted from the foregoing encoded code block according to a size of a scheduling resource, to form the code word. For example, a length of a code block is N bits, and a length of an encoded code block is 3N bits. If M REs need to be scheduled, and QPSK modulation is used, a corresponding quantity of bits is 2M. 2M bits are extracted from the foregoing encoded code block whose length is 3N, to form the foregoing code word.

Step 302: Determine an l×l matrix used by the $M_{symb}$ complex-valued modulation symbols included in each data stream, where the l×l matrix is one of an l×l identity matrix and a circulant matrix of the l×l identity matrix. This step may be implemented by the mapping module 102 in the figure or the processor 201 in FIG. 3.

Preferably, in this step, multiple manners may be used to determine the l×l matrix used by the $M_{symb}$ complex-valued modulation symbols included in each data stream. The l×l matrix is an element in a matrix set, where the matrix set includes one l×l identity matrix and (l−1) circulant matrices obtained by performing cyclic shift based on the identity matrix, such as the foregoing $D_0$ to $D_3$. When determining the l×l matrix used by the $M_{symb}$ complex-valued modulation symbols included in each data stream, the mapping module 102 may select, in a polling manner, a matrix from the matrix set for a complex-valued modulation symbol to which an l×l identity matrix currently needs to be allocated.

To simplify technical implementation, preferably, the l×l matrix used by the $M_{symb}$ complex-valued modulation symbols included in each data stream may be determined in one of the following manner 1 to the following manner 3.

For the $M_{symb}$ complex-valued modulation symbols included in each data stream, an index number of the l×l matrix used by the complex-valued modulation symbols is determined according to frequency-domain information corresponding to the complex-valued modulation symbols and according to a formula (1), a formula (2), or a formula (3).

Manner 1.

The mapping module 102 may determine, for the $M_{symb}$ complex-valued modulation symbols included in each data stream and according to the formula (1), the formula (2), or the formula (3), the index number of the l×l matrix used by the complex-valued modulation symbols. After the index number of the l×l matrix used by the complex-valued modulation symbols is determined in the foregoing manner 1, and after operations of layer permutation mapping and precoding processing are performed, different complex-valued modulation symbols of a same code word may be basically evenly distributed in a frequency domain, so as to obtain a spatial diversity gain.

Manner 2.

As described above, after the layer permutation mapping is performed, data obtained after the layer permutation mapping is mapped to a symbol (for example, an OFDM symbol) by means of processing operations such as precoding and symbol modulation. For the $M_{symb}$ complex-valued modulation symbols included in each data stream, the index number of the l×l matrix used by the complex-valued modulation symbols may be determined according to a formula (4). After the index number of the l×l matrix used by the complex-valued modulation symbols is determined in the foregoing manner 2, and after operations of layer permutation mapping and precoding processing are performed, different complex-valued modulation symbols of a same code word may be relatively evenly distributed in a time domain, so as to obtain a time-frequency diversity gain.

Manner 3.

With reference to the methods provided in the foregoing manner 1 and manner 2, in the manner 3, for the $M_{symb}$ complex-valued modulation symbols included in each data stream, the index number of the l×l matrix used by the complex-valued modulation symbols may be determined according to a formula (5) or a formula (6). After the index number of the l×l matrix used by the complex-valued modulation symbols is determined in the foregoing manner 3, and after operations of layer permutation mapping and precoding processing are performed, different complex-valued modulation symbols of a same code word may be relatively evenly distributed in a frequency domain and in a time domain, so as to obtain a time-frequency diversity gain.

Step 303: Perform, by using the determined l×l matrix, layer permutation mapping on the $M_{symb}$ complex-valued modulation symbols included in each data stream. This step may be implemented by the mapping module 102 in FIG. 1 or the processor 201 in FIG. 3.

Preferably, before step 301, the procedure may further include the following step: partitioning a transport block scheduled in one scheduling period into q sub transport blocks, separately partitioning the q sub transport blocks and adding CRC codes to the q sub transport blocks to obtain q code blocks, and separately encoding the q code blocks to obtain the q code words, where the q code words are in a one-to-one correspondence with the q data streams. The transport block is a data packet scheduled by an MAC layer.

For example, if one transport block is scheduled in one scheduling period, the data input module 101 may partition the transport block into q sub transport blocks, separately perform processing operations of partitioning the q sub transport blocks and adding CRC codes to the q sub transport blocks to obtain q code blocks, and perform encoding processing on the q code blocks to obtain q code words.

For another example, if Y (1<Y≤q) transport blocks are scheduled in one scheduling period, the data input module 101 may partition one of the Y transport blocks into Y1 (Y1=q−Y+1i) sub transport blocks, and use each remaining transport block as one sub transport block, thereby obtaining q sub transport blocks in total; and separately perform processing operations of partitioning the q sub transport blocks and adding CRC codes to the q sub transport blocks to obtain q code blocks, and separately perform encoding processing on the q code blocks to obtain q code words.

Parallel calculation can be implemented better in a software architecture by using a two-level partitioning solution for a transport block, so as to increase a calculation speed and improve a processing capability.

It can be learned from the foregoing description of this embodiment that, because an identity matrix and a circulant matrix of the identity matrix are used to separately map $M_{symb}$ complex-valued modulation symbols of a data stream to different transport layers according to an arrangement rule of elements in the circulant matrix, the $M_{symb}$ complex-valued modulation symbols of the data stream are scattered at multiple transport layers. Therefore, a time-frequency diversity is obtained by means of channel encoding, and a spatial diversity gain is further obtained for each data stream, thereby increasing a time-frequency spatial diversity gain, and further improving system transmission efficiency.

For a clearer understanding of this embodiment, the following uses an example in which four code words or data streams are mapped to four transport layers and an RE group includes two REs to describe a specific implementation process of step 302 and step 303 of the foregoing procedure.

All $M_{symb}$ complex-valued modulation symbols of each code word or each data stream have an index number, and index numbers of different code words or data streams may be the same. A value range of the index number may be [1, $M_{symb}$] or [0, ($M_{symb}$−1)], which is not limited in the present embodiments. The range of the index number in this embodiment is specified as [0, ($M_{symb}$−1)]. For example, index numbers of $M_{symb}$ complex-valued modulation symbols of a code word 1 are respectively 0, 1, 2, ..., ($M_{symb}$−1), and index numbers of $M_{symb}$ complex-valued modulation symbols of a code word 2 are respectively 0, 1, 2, ..., ($M_{symb}$−1).

All of l matrices (l is a quantity of transport layers) in the matrix set that are used to perform layer permutation mapping have an index number. A value range of an index number may be [0, l−1], which is not limited in the present embodiments. The matrix set includes an l×l identity matrix and a circulant matrix of the l×l identity matrix. This embodiment sets no limitation on an arrangement sequence of these matrices.

The layer permutation mapping may be defined by using the following formula:

$$\begin{bmatrix} y^{(0)}(i) \\ \vdots \\ y^{(l-1)}(i) \end{bmatrix} = D_j(i) \begin{bmatrix} x^{(0)}(i) \\ \vdots \\ x^{(l-1)}(i) \end{bmatrix} \quad (7)$$

In a formula (7), i indicates an index number of a complex-valued modulation symbol, and a value range is [0, ($M_{symb}$−1)]; $x^q(i)=[x^{(0)}(i) \ldots x^{(l-1)}(i)]^T$ indicates distribution of an $i^{th}$ complex-valued modulation symbol of a code word at l layers before the layer permutation mapping is performed, where $x^{(0)}(i)$ indicates an $i^{th}$ complex-valued modulation symbol that is of a code word and is distributed at a first layer, and $x^{(l-1)}(i)$ indicates an $i^{th}$ complex-valued modulation symbol that is of a code word and is distributed at an $l^{th}$ layer; and $y^q(i)=[y^{(0)}(i) \ldots y^{(l-1)}(i)]^T$ indicates distribution of the $i^{th}$ complex-valued modulation symbol of the code word at the l layers after the layer permutation mapping is performed, where $y^{(0)}k(i)$ indicates an $i^{th}$ complex-valued modulation symbol that is of a code word and is distributed at the first layer, and $y^{(l-1)}(i)$ indicates an $i^{th}$ complex-valued modulation symbol that is of a code word and is distributed on the $l^{th}$ layer; and $D_j(i)$ indicates an l×l matrix whose index number is j and that is used by an $i^{th}$ complex-valued modulation symbol of a code word. After calculation is performed by using the formula (7), the $i^{th}$ complex-valued modulation symbol of the code word is evenly distributed at the l layers.

An example in which four code words are mapped to four transport layers is used, where the four code words are respectively represented as a code word 1, a code word 2, a code word 3, and a code word 4, and the four transport layers are respectively represented as a layer 0, a layer 1, a layer 2, and layer 3. Each code word is encoded into nine complex-valued modulation symbols. For example, complex-valued modulation symbols of the code word 1 are respectively represented as: a complex-valued modulation symbol 1 of the code word 1, a complex-valued modulation symbol 2 of the code word 1, ..., and a complex-valued modulation symbol 9 of the code word 1; and complex-valued modulation symbols of the code word 2 are respectively represented as: a complex-valued modulation symbol 1 of the code word 2, a complex-valued modulation symbol 2 of the code word 2, . . . , and a complex-valued modulation symbol 9 of the code word 2. All complex-valued modulation symbols of a code word q are represented as: $d^{(q)}(0), \ldots, d^{(q)}(M_{symb}^{(q)}-1)$ in this embodiment. There are four code words in total, a value range of q is [1,4], and $M_{symb}^{(q)}=9$, that is, all the complex-valued modulation symbols of the code word q are respectively $d^{(q)}(0), \ldots, d^{(q)}(8)$.

A 4×4 identity matrix and a circulant matrix of the 4×4 identity matrix are the same as the foregoing $D_0$ to $D_3$.

In the manner 1 of step 302 of the foregoing procedure, assuming that g in the formula (1) is 2, it may be learned according to the foregoing formula (1) that: an index number of a 4×4 matrix used by complex-valued modulation symbols o of the code word 1 to the code word 4 is 0, that is, the 4×4 matrix used by the complex-valued modulation symbols 0 of the code words 1 to 4 is $D_0$; an index number of a 4×4 matrix used by complex-valued modulation symbols 1 and complex-valued modulation symbols 2 of the code word 1 to the code word 4 is 1, that is, the 4×4 matrix used by the complex-valued modulation symbols 1 and the complex-valued modulation symbols 2 of the code words 1 to 4 is D1; an index number of a 4×4 matrix used by complex-valued modulation symbols 3 and complex-valued modulation symbols 4 of the code word 1 to the code word 4 is 2, that is, the 4×4 matrix used by the complex-valued modulation symbols 3 and the complex-valued modulation symbols 4 of the code words 1 to 4 is $D_2$; an index number of a 4×4 matrix used by complex-valued modulation symbols 5 and complex-valued modulation symbols 6 of the code word 1 to the code word 4 is 3, that is, the 4×4 matrix used by the complex-valued modulation symbols 5 and the complex-valued modulation symbols 6 of the code words 1 to 4 is $D_3$; and an index number of a 4×4 matrix used by complex-valued modulation symbols 7 and complex-valued modulation symbols 8 of the code word 1 to the code word 4 is 0, that is, the 4×4 matrix used by the complex-valued modulation symbols 7 and the complex-valued modulation symbols 8 of the code words 1 to 4 is $D_0$.

After the index number, of the l×l matrix, corresponding to the index number of the complex-valued modulation symbol of the code word is determined, according to the determined l×l matrix, layer permutation mapping is performed on the $M_{symb}$ complex-valued modulation symbols included in each data stream.

The index number of the 4×4 matrix used by the complex-valued modulation symbols 0 of the code word 1 to the code word 4 is 0, that is, the 4×4 matrix used by the complex-valued modulation symbols 0 of the code words 1 to 4 is $D_0$.

The 4×4 matrix used by the complex-valued modulation symbols o of the code words 1 to 4 is $D_0$, and calculation is specifically as follows:

$$[d^{(1)}(0) d^{(2)}(0) d^{(3)}(0) d^{(4)}(0)]*D_0 = [d^{(1)}(0) d^{(2)}(0) d^{(3)}(0) d^{(4)}(0)]$$

The 4×4 matrix used by the complex-valued modulation symbols 1 and the complex-valued modulation symbols 2 of the code words 1 to 4 is $D_1$, and calculation is specifically as follows:

$$\begin{bmatrix} d^{(1)}(1) & d^{(2)}(1) & d^{(3)}(1) & d^{(4)}(1) \\ d^{(1)}(2) & d^{(2)}(2) & d^{(3)}(2) & d^{(4)}(2) \end{bmatrix} * D_1 = \begin{bmatrix} d^{(4)}(1) & d^{(1)}(1) & d^{(2)}(1) & d^{(3)}(1) \\ d^{(4)}(2) & d^{(1)}(2) & d^{(2)}(2) & d^{(3)}(2) \end{bmatrix}.$$

It can be learned that, after all code words:

$$\begin{bmatrix} d^{(1)}(1) & d^{(2)}(1) & d^{(3)}(1) & d^{(4)}(1) \\ d^{(1)}(2) & d^{(2)}(2) & d^{(3)}(2) & d^{(4)}(2) \end{bmatrix}$$

whose index numbers of complex-valued modulation symbols are 1 and 2 are mapped by using the matrix $D_1$, a sequence of all the code words whose index numbers of the complex-valued modulation symbols are 1 and 2 is adjusted at each layer. The adjusted:

$$\begin{bmatrix} d^{(4)}(1) & d^{(1)}(1) & d^{(2)}(1) & d^{(3)}(1) \\ d^{(4)}(2) & d^{(1)}(2) & d^{(2)}(2) & d^{(3)}(2) \end{bmatrix}$$

indicates that the complex-valued modulation symbol 1 and the complex-valued modulation symbol 2 that are of the code word 4 are at a first layer, the complex-valued modulation symbol 1 and the complex-valued modulation symbol 2 that are of the code word 1 are at a second layer, the complex-valued modulation symbol 1 and the complex-valued modulation symbol 2 that are of the code word 2 are at a third layer, and the complex-valued modulation symbol 1 and the complex-valued modulation symbol 2 that are of the code word 3 are at a fourth layer.

The 4×4 matrix used by the complex-valued modulation symbols 3 and the complex-valued modulation symbols 4 of the code words 1 to 4 is D2, and calculation is specifically as follows:

$$\begin{bmatrix} d^{(1)}(3) & d^{(2)}(3) & d^{(3)}(3) & d^{(4)}(3) \\ d^{(1)}(4) & d^{(2)}(4) & d^{(3)}(4) & d^{(4)}(4) \end{bmatrix} * D_2 = \begin{bmatrix} d^{(3)}(3) & d^{(4)}(3) & d^{(1)}(3) & d^{(2)}(3) \\ d^{(3)}(4) & d^{(4)}(4) & d^{(1)}(4) & d^{(2)}(4) \end{bmatrix}.$$

It can be learned that, after all code words:

$$\begin{bmatrix} d^{(1)}(3) & d^{(2)}(3) & d^{(3)}(3) & d^{(4)}(3) \\ d^{(1)}(4) & d^{(2)}(4) & d^{(3)}(4) & d^{(4)}(4) \end{bmatrix}$$

whose index numbers of complex-valued modulation symbols are 3 and 4 are mapped by using the matrix $D_2$, a sequence of all the code words whose index numbers of the complex-valued modulation symbols are 3 and 4 is adjusted at each layer. The adjusted:

$$\begin{bmatrix} d^{(3)}(3) & d^{(4)}(3) & d^{(1)}(3) & d^{(2)}(3) \\ d^{(3)}(4) & d^{(4)}(4) & d^{(1)}(4) & d^{(2)}(4) \end{bmatrix}$$

indicates that the complex-valued modulation symbol 3 and the complex-valued modulation symbol 4 that are of the code word 3 are at a first layer, the complex-valued modulation symbol 3 and the complex-valued modulation symbol 4 that are of the code word 4 are at a second layer, the complex-valued modulation symbol 3 and the complex-valued modulation symbol 4 that are of the code word 1 are at a third layer, and the complex-valued modulation symbol 3 and the complex-valued modulation symbol 4 that are of the code word 2 are at a fourth layer.

The 4×4 matrix used by the complex-valued modulation symbols 5 and the complex-valued modulation symbols 6 of the code words 1 to 4 is $D_3$, and calculation is specifically as follows:

$$\begin{bmatrix} d^{(1)}(5) & d^{(2)}(5) & d^{(3)}(5) & d^{(4)}(5) \\ d^{(1)}(6) & d^{(2)}(6) & d^{(3)}(6) & d^{(4)}(6) \end{bmatrix} * D_3 =$$

$$\begin{bmatrix} d^{(2)}(5) & d^{(3)}(5) & d^{(4)}(5) & d^{(1)}(5) \\ d^{(2)}(6) & d^{(3)}(6) & d^{(4)}(6) & d^{(1)}(6) \end{bmatrix}.$$

It can be learned that, after all code words:

$$\begin{bmatrix} d^{(1)}(5) & d^{(2)}(5) & d^{(3)}(5) & d^{(4)}(5) \\ d^{(1)}(6) & d^{(2)}(6) & d^{(3)}(6) & d^{(4)}(6) \end{bmatrix}$$

whose index numbers of complex-valued modulation symbols are 5 and 6 are mapped by using the matrix $D_3$, a sequence of all the code words whose index numbers of the complex-valued modulation symbols are 5 and 6 is adjusted at each layer. The adjusted:

$$\begin{bmatrix} d^{(2)}(5) & d^{(3)}(5) & d^{(4)}(5) & d^{(1)}(5) \\ d^{(2)}(6) & d^{(3)}(6) & d^{(4)}(6) & d^{(1)}(6) \end{bmatrix}$$

indicates that the complex-valued modulation symbol 5 and the complex-valued modulation symbol 6 that are of the code word 2 are at a first layer, the complex-valued modulation symbol 5 and the complex-valued modulation symbol 6 that are of the code word 3 are at a second layer, the complex-valued modulation symbol 5 and the complex-valued modulation symbol 6 that are of the code word 4 are at a third layer, and the complex-valued modulation symbol 5 and the complex-valued modulation symbol 6 that are of the code word 1 are at a fourth layer.

The 4×4 matrix used by the complex-valued modulation symbols 7 and the complex-valued modulation symbols 8 of the code words 1 to 4 is $D_0$, and calculation is specifically as follows:

$$\begin{bmatrix} d^{(1)}(7) & d^{(2)}(7) & d^{(3)}(7) & d^{(4)}(7) \\ d^{(1)}(8) & d^{(2)}(8) & d^{(3)}(8) & d^{(4)}(8) \end{bmatrix} * D_0 =$$

$$\begin{bmatrix} d^{(1)}(7) & d^{(2)}(7) & d^{(3)}(7) & d^{(4)}(7) \\ d^{(1)}(8) & d^{(2)}(8) & d^{(3)}(8) & d^{(4)}(8) \end{bmatrix}.$$

It can be learned that, after all code words:

$$\begin{bmatrix} d^{(1)}(7) & d^{(2)}(7) & d^{(3)}(7) & d^{(4)}(7) \\ d^{(1)}(8) & d^{(2)}(8) & d^{(3)}(8) & d^{(4)}(8) \end{bmatrix}$$

whose index numbers of complex-valued modulation symbols are 7 and 8 are mapped by using the matrix $D_0$, a sequence of all the code words whose index numbers of the complex-valued modulation symbols are 7 and 8 is adjusted at each layer. The adjusted:

$$\begin{bmatrix} d^{(1)}(7) & d^{(2)}(7) & d^{(3)}(7) & d^{(4)}(7) \\ d^{(1)}(8) & d^{(2)}(8) & d^{(3)}(8) & d^{(4)}(8) \end{bmatrix}$$

indicates that the complex-valued modulation symbol 7 and the complex-valued modulation symbol 8 that are of the code word 1 are at a first layer, the complex-valued modulation symbol 7 and the complex-valued modulation symbol 8 that are of the code word 2 are at a second layer, the complex-valued modulation symbol 7 and the complex-valued modulation symbol 8 that are of the code word 3 are at a third layer, and the complex-valued modulation symbol 7 and the complex-valued modulation symbol 8 that are of the code word 4 are at a fourth layer.

Complex-valued modulation symbols of all the code words are rearranged at the four layers after mapping is performed by using the corresponding 1×1 matrix, and a specific example is as follows:

$$\begin{bmatrix} d^{(1)}(0) & d^{(2)}(0) & d^{(3)}(0) & d^{(4)}(0) \\ d^{(4)}(1) & d^{(1)}(1) & d^{(2)}(1) & d^{(3)}(1) \\ d^{(4)}(2) & d^{(1)}(2) & d^{(2)}(2) & d^{(3)}(2) \\ d^{(3)}(3) & d^{(4)}(3) & d^{(1)}(3) & d^{(2)}(3) \\ d^{(3)}(4) & d^{(4)}(4) & d^{(1)}(4) & d^{(2)}(4) \\ d^{(2)}(5) & d^{(3)}(5) & d^{(4)}(5) & d^{(1)}(5) \\ d^{(2)}(6) & d^{(3)}(6) & d^{(4)}(6) & d^{(1)}(6) \\ d^{(1)}(7) & d^{(2)}(7) & d^{(3)}(7) & d^{(4)}(7) \\ d^{(1)}(8) & d^{(2)}(8) & d^{(3)}(8) & d^{(4)}(8) \end{bmatrix}.$$

Figure 6:
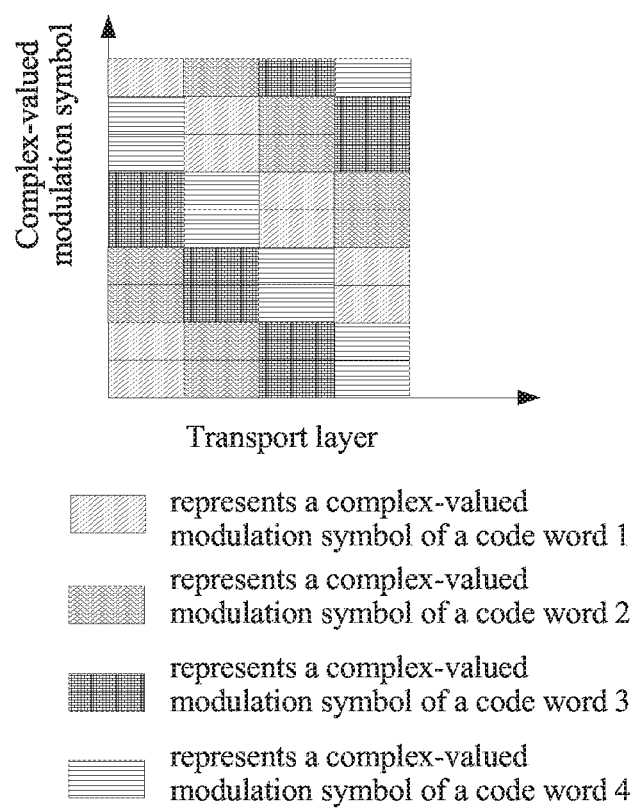
FIG. 6 and FIG. 7 are separately schematic diagrams of arrangement of complex-valued modulation symbols of code words at each transport layer after layer permutation mapping according to an embodiment.

A corresponding schematic diagram of the foregoing matrix is shown in FIG. 6. Each grid in FIG. 6 represents a complex-valued modulation symbol of a code word, a horizontal coordinate indicates a layer, and a vertical coordinate indicates index numbers of complex-valued modulation symbols of all code words. It can be learned from FIG. 6 that complex-valued modulation symbols of each code word are relatively evenly mapped to four layers.

It can be learned from the foregoing matrix that after mapping is performed by using the 1×1 matrix, duplicates of all the code words are evenly distributed at each layer. The foregoing matrix is an effect obtained by means of mapping by using the 1×1 matrix when each two resource group elements are used as one group.

Figure 7:
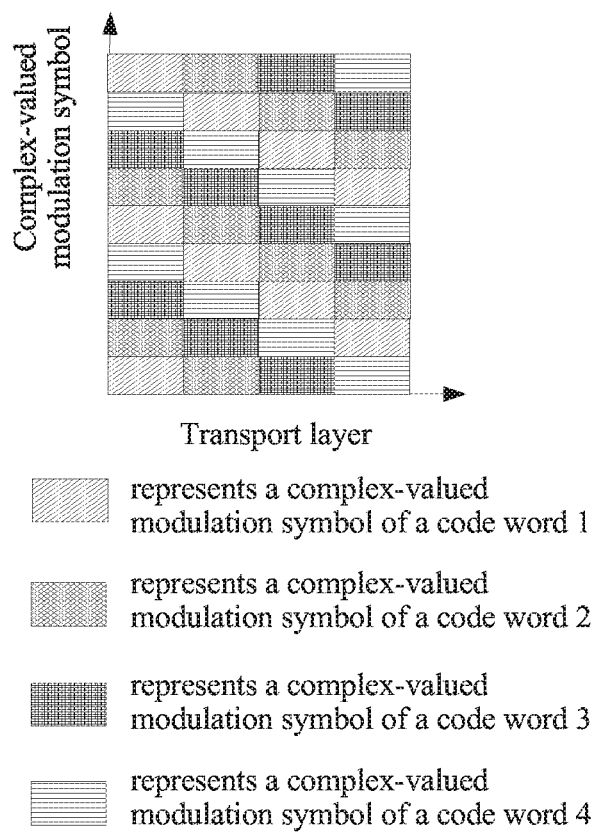

When each resource group element is used as one group, calculation performed by using the formula (3) is the same as the foregoing calculation method, and details are not described herein again. After mapping is performed by using the 1×1 matrix, a scattered effect of complex-valued modulation symbols of each code word is better. As shown in FIG. 7, each grid in FIG. 7 represents a complex-valued modulation symbol of a code word, a horizontal coordinate indicates a layer, and a vertical coordinate indicates index numbers of complex-valued modulation symbols of all code words. It can be learned from FIG. 7 that complex-valued modulation symbols of each code word are relatively evenly mapped to four layers.

During the foregoing layer permutation mapping process, all complex-valued modulation symbols of all the code words are evenly distributed at different transport layers. All data at transport layers is separately mapped to corresponding resource elements after precoding processing, so as to generate an OFDM symbol and transmit the OFDM symbol by using a radio frequency antenna unit.

In the manner 2 of step 302 of the foregoing procedure, it is assumed that each resource group includes two resource elements. Preferably, two resource elements in a resource group are mapped to one symbol. It can be learned from the foregoing formula (4) that: an index number of a 4×4 matrix used by complex-valued modulation symbols o of the code word 1 to the code word 4 is o, that is, the 4×4 matrix used by the complex-valued modulation symbols o of the code words i to 4 is $D_0$; an index number of a 4×4 matrix used by complex-valued modulation symbols 1 and complex-valued modulation symbols 2 of the code word 1 to the code word 4 is i, that is, the 4×4 matrix used by the complex-valued modulation symbols 1 and the complex-valued modulation symbols 2 of the code words 1 to 4 is $D_1$; an index number of a 4×4 matrix used by complex-valued modulation symbols 3 and complex-valued modulation symbols 4 of the code word 1 to the code word 4 is 2, that is, the 4×4 matrix used by the complex-valued modulation symbols 3 and the complex-valued modulation symbols 4 of the code words i to 4 is $D_2$; an index number of a 4×4 matrix used by complex-valued modulation symbols 5 and complex-valued modulation symbols 6 of the code word 1 to the code word 4 is 3, that is, the 4×4 matrix used by the complex-valued modulation symbols 5 and the complex-valued modulation symbols 6 of the code words 1 to 4 is $D_3$; and an index number of a 4×4 matrix used by complex-valued modulation symbols 7 and complex-valued modulation symbols 8 of the code word 1 to the code word 4 is 0, that is, the 4×4 matrix used by the complex-valued modulation symbols 7 and the complex-valued modulation symbols 8 of the code words i to 4 is $D_0$.

After the index number, of the l×l matrix, corresponding to the index number of the complex-valued modulation symbol of the code word is determined, according to the determined l×l matrix, layer permutation mapping is performed on the $M_{symb}$ complex-valued modulation symbols included in each data stream.

The index number of the 4×4 matrix used by the complex-valued modulation symbols o of the code word 1 to the code word 4 is o, that is, the 4×4 matrix used by the complex-valued modulation symbols o of the code words 1 to 4 is $D_0$.

The 4×4 matrix used by the complex-valued modulation symbols o of the code words 1 to 4 is $D_0$, and calculation is specifically as follows:

$$[d^{(1)}(0) d^{(2)}(0) d^{(3)}(0) d^{(4)}(0)]*D_0 = [d^{(1)}(0) d^{(2)}(0) d^{(3)}(0) d^{(4)}(0)].$$

The 4×4 matrix used by the complex-valued modulation symbols 1 and the complex-valued modulation symbols 2 of the code words 1 to 4 is $D_1$, and calculation is specifically as follows:

$$\begin{bmatrix} d^{(1)}(1) & d^{(2)}(1) & d^{(3)}(1) & d^{(4)}(1) \\ d^{(1)}(2) & d^{(2)}(2) & d^{(3)}(2) & d^{(4)}(2) \end{bmatrix}*D_1 =$$

$$\begin{bmatrix} d^{(4)}(1) & d^{(1)}(1) & d^{(2)}(1) & d^{(3)}(1) \\ d^{(4)}(2) & d^{(1)}(2) & d^{(2)}(2) & d^{(3)}(2) \end{bmatrix}.$$

The 4×4 matrix used by the complex-valued modulation symbols 3 and the complex-valued modulation symbols 4 of the code words 1 to 4 is $D_2$, and calculation is specifically as follows:

$$\begin{bmatrix} d^{(1)}(3) & d^{(2)}(3) & d^{(3)}(3) & d^{(4)}(3) \\ d^{(1)}(4) & d^{(2)}(4) & d^{(3)}(4) & d^{(4)}(4) \end{bmatrix}*D_2 =$$

$$\begin{bmatrix} d^{(3)}(3) & d^{(4)}(3) & d^{(1)}(3) & d^{(2)}(3) \\ d^{(3)}(4) & d^{(4)}(4) & d^{(1)}(4) & d^{(2)}(4) \end{bmatrix}.$$

The 4×4 matrix used by the complex-valued modulation symbols 5 and the complex-valued modulation symbols 6 of the code words 1 to 4 is $D_3$, and calculation is specifically as follows:

$$\begin{bmatrix} d^{(1)}(5) & d^{(2)}(5) & d^{(3)}(5) & d^{(4)}(5) \\ d^{(1)}(6) & d^{(2)}(6) & d^{(3)}(6) & d^{(4)}(6) \end{bmatrix}*D_3 =$$

$$\begin{bmatrix} d^{(2)}(5) & d^{(3)}(5) & d^{(4)}(5) & d^{(1)}(5) \\ d^{(2)}(6) & d^{(3)}(6) & d^{(4)}(6) & d^{(1)}(6) \end{bmatrix}.$$

The 4×4 matrix used by the complex-valued modulation symbols 7 and the complex-valued modulation symbols 8 of the code words 1 to 4 is $D_0$, and calculation is specifically as follows:

$$\begin{bmatrix} d^{(1)}(7) & d^{(2)}(7) & d^{(3)}(7) & d^{(4)}(7) \\ d^{(1)}(8) & d^{(2)}(8) & d^{(3)}(8) & d^{(4)}(8) \end{bmatrix}*D_0 =$$

$$\begin{bmatrix} d^{(1)}(7) & d^{(2)}(7) & d^{(3)}(7) & d^{(4)}(7) \\ d^{(1)}(8) & d^{(2)}(8) & d^{(3)}(8) & d^{(4)}(8) \end{bmatrix}.$$

Complex-valued modulation symbols of all the code words are rearranged at the four layers after mapping is performed by using the corresponding l×l matrix, and a specific example is as follows:

$$\begin{bmatrix} d^{(1)}(0) & d^{(2)}(0) & d^{(3)}(0) & d^{(4)}(0) \\ d^{(4)}(1) & d^{(1)}(1) & d^{(2)}(1) & d^{(3)}(1) \\ d^{(4)}(2) & d^{(1)}(2) & d^{(2)}(2) & d^{(3)}(2) \\ d^{(3)}(3) & d^{(4)}(3) & d^{(1)}(3) & d^{(2)}(3) \\ d^{(3)}(4) & d^{(4)}(4) & d^{(1)}(4) & d^{(2)}(4) \\ d^{(2)}(5) & d^{(3)}(5) & d^{(4)}(5) & d^{(1)}(5) \\ d^{(2)}(6) & d^{(3)}(6) & d^{(4)}(6) & d^{(1)}(6) \\ d^{(1)}(7) & d^{(2)}(7) & d^{(3)}(7) & d^{(4)}(7) \\ d^{(1)}(8) & d^{(2)}(8) & d^{(3)}(8) & d^{(4)}(8) \end{bmatrix}.$$

A corresponding schematic diagram of the foregoing matrix is shown in FIG. 6. Each grid in FIG. 6 represents a complex-valued modulation symbol of a code word, a horizontal coordinate indicates a layer, and a vertical coordinate indicates index numbers of complex-valued modulation symbols of all code words. It can be learned from FIG. 6 that complex-valued modulation symbols of each code word are relatively evenly mapped to four layers.

It can be learned from the foregoing matrix that after mapping is performed by using the l×l matrix, duplicates of all the code words are evenly distributed at each layer. The foregoing matrix is an effect obtained by means of mapping by using the l×l matrix when each two resource group elements are used as one group.

During the foregoing layer permutation mapping process, all complex-valued modulation symbols of all the code words are evenly distributed at different transport layers. All data at transport layers is separately mapped to corresponding resource elements after precoding processing, so as to generate an OFDM symbol and transmit the OFDM symbol by using a radio frequency antenna unit.

In the manner 3 of step 302 of the foregoing procedure, it can be learned from the foregoing formula (5) that: an index number of a 4×4 matrix used by complex-valued modulation symbols o of the code word 1 to the code word 4 is 0, that is, the 4×4 matrix used by the complex-valued modulation symbols o of the code words 1 to 4 is $D_0$; an index number of a 4×4 matrix used by complex-valued modulation symbols 1 and complex-valued modulation symbols 2 of the code word 1 to the code word 4 is 2, that is, the 4×4 matrix used by the complex-valued modulation symbols 1 and the complex-valued modulation symbols 2 of the code words 1 to 4 is D2; an index number of a 4×4 matrix used by complex-valued modulation symbols 3 and complex-valued modulation symbols 4 of the code word 1 to the code word 4 is 0, that is, the 4×4 matrix used by the complex-valued modulation symbols 3 and the complex-valued modulation symbols 4 of the code words 1 to 4 is $D_0$; an index number of a 4×4 matrix used by complex-valued modulation symbols 5 and complex-valued modulation symbols 6 of the code word 1 to the code word 4 is 2, that is, the 4×4 matrix used by the complex-valued modulation symbols 5 and the complex-valued modulation symbols 6 of the code words 1 to 4 is $D_2$; and an index number of a 4×4 matrix used by complex-valued modulation symbols 7 and complex-valued modulation symbols 8 of the code word 1 to the code word 4 is 0, that is, the 4×4 matrix used by the complex-valued modulation symbols 7 and the complex-valued modulation symbols 8 of the code words 1 to 4 is $D_0$.

After the index number, of the l×l matrix, corresponding to the index number of the complex-valued modulation symbol of the code word is determined, according to the determined l×l matrix, layer permutation mapping is performed on the $M_{symb}$ complex-valued modulation symbols included in each data stream.

By using the determined l×l matrix, layer permutation mapping is performed on the $M_{symb}$ complex-valued modulation symbols included in each data stream.

The index number of the 4×4 matrix used by the complex-valued modulation symbols 0 of the code word 1 to the code word 4 is 0, that is, the 4×4 matrix used by the complex-valued modulation symbols o of the code words 1 to 4 is $D_0$.

The 4×4 matrix used by the complex-valued modulation symbols o of the code words 1 to 4 is $D_0$, and calculation is specifically as follows:

$$[d^{(1)}(0)\, d^{(2)}(0)\, d^{(3)}(0)\, d^{(4)}(0)]*D_0 = [d^{(1)}(0)\, d^{(2)}(0)\, d^{(3)}(0)\, d^{(4)}(0)]$$

The 4×4 matrix used by the complex-valued modulation symbols 1 and the complex-valued modulation symbols 2 of the code words 1 to 4 is $D_2$, and calculation is specifically as follows:

$$\begin{bmatrix} d^{(1)}(1) & d^{(2)}(1) & d^{(3)}(1) & d^{(4)}(1) \\ d^{(1)}(2) & d^{(2)}(2) & d^{(3)}(2) & d^{(4)}(2) \end{bmatrix} *D_2 = \begin{bmatrix} d^{(3)}(1) & d^{(4)}(1) & d^{(1)}(1) & d^{(2)}(1) \\ d^{(3)}(2) & d^{(4)}(2) & d^{(1)}(2) & d^{(2)}(2) \end{bmatrix}.$$

The 4×4 matrix used by the complex-valued modulation symbols 3 and the complex-valued modulation symbols 4 of the code words 1 to 4 is $D_0$, and calculation is specifically as follows:

$$\begin{bmatrix} d^{(1)}(3) & d^{(2)}(3) & d^{(3)}(3) & d^{(4)}(3) \\ d^{(1)}(4) & d^{(2)}(4) & d^{(3)}(4) & d^{(4)}(4) \end{bmatrix} *D_0 = \begin{bmatrix} d^{(1)}(3) & d^{(2)}(3) & d^{(3)}(3) & d^{(4)}(3) \\ d^{(1)}(4) & d^{(2)}(4) & d^{(3)}(4) & d^{(4)}(4) \end{bmatrix}.$$

The 4×4 matrix used by the complex-valued modulation symbols 5 and the complex-valued modulation symbols 6 of the code words 1 to 4 is D2, and calculation is specifically as follows:

$$\begin{bmatrix} d^{(1)}(5) & d^{(2)}(5) & d^{(3)}(5) & d^{(4)}(5) \\ d^{(1)}(6) & d^{(2)}(6) & d^{(3)}(6) & d^{(4)}(6) \end{bmatrix} *D_2 = \begin{bmatrix} d^{(3)}(5) & d^{(4)}(5) & d^{(1)}(5) & d^{(2)}(5) \\ d^{(3)}(6) & d^{(4)}(6) & d^{(1)}(6) & d^{(2)}(6) \end{bmatrix}.$$

The 4×4 matrix used by the complex-valued modulation symbols 7 and the complex-valued modulation symbols 8 of the code words 1 to 4 is $D_0$, and calculation is specifically as follows:

$$\begin{bmatrix} d^{(1)}(7) & d^{(2)}(7) & d^{(3)}(7) & d^{(4)}(7) \\ d^{(1)}(8) & d^{(2)}(8) & d^{(3)}(8) & d^{(4)}(8) \end{bmatrix} *D_0 = \begin{bmatrix} d^{(1)}(7) & d^{(2)}(7) & d^{(3)}(7) & d^{(4)}(7) \\ d^{(1)}(8) & d^{(2)}(8) & d^{(3)}(8) & d^{(4)}(8) \end{bmatrix}.$$

Complex-valued modulation symbols of all the code words are rearranged at the four layers after mapping is performed by using the corresponding l×l matrix. It can be learned from the foregoing matrix that duplicates of all the code words are evenly distributed at each layer after mapping is performed by using the l×l matrix.

During the foregoing layer permutation mapping process, all complex-valued modulation symbols of all the code words are evenly distributed at different transport layers. All data at transport layers is separately mapped to corresponding resource elements after precoding processing, so as to generate an OFDM symbol and transmit the OFDM symbol by using a radio frequency antenna unit.

Without layer permutation mapping by using a matrix in the prior art, all complex-valued modulation symbols of the code word 1, the code word 2, the code word 3, and the code word 4 are mapped at four corresponding layers in a sequence of the code word 1, the code word 2, the code word 3, and the code word 4, which is represented in a matrix form as follows:

$$\begin{bmatrix} d^{(0)}(1) & d^{(0)}(2) & d^{(0)}(3) & d^{(0)}(4) \\ d^{(1)}(1) & d^{(1)}(2) & d^{(1)}(3) & d^{(1)}(4) \\ \ldots & \ldots & \ldots & \ldots \\ \ldots & \ldots & \ldots & \ldots \\ \ldots & \ldots & \ldots & \ldots \\ d^{(8)}(1) & d^{(8)}(2) & d^{(8)}(3) & d^{(8)}(4) \end{bmatrix}.$$

Figure 5:
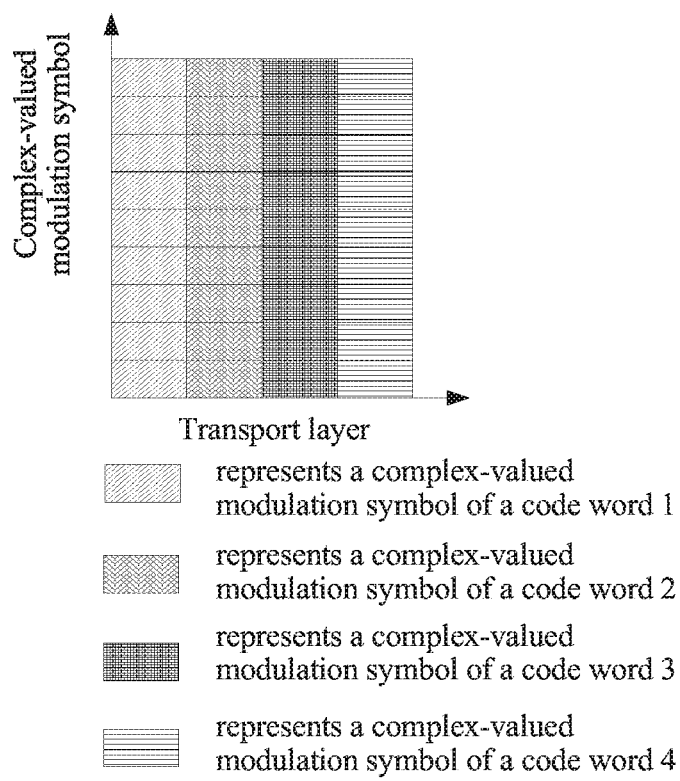
FIG. 5 is a schematic diagram of arrangement of complex-valued modulation symbols of code words at each transport layer after layer permutation mapping in the prior art.

In the foregoing matrix, a column vector indicates a quantity of layers, that is, the first column indicates an arrangement sequence of all elements at a first layer, the second column indicates an arrangement sequence of all elements at a second layer, the third column indicates an arrangement sequence of all elements at a third layer, and the fourth column indicates an arrangement sequence of all elements at a fourth layer. For a schematic diagram of arrangement of the foregoing matrix, refer to FIG. 5. Each grid in FIG. 5 represents a complex-valued modulation symbol of a code word, a horizontal coordinate indicates a layer, and a vertical coordinate indicates index numbers of complex-valued modulation symbols of all code words.

It can be learned that, without the layer permutation mapping by using the matrix, the complex-valued modulation symbols of all the code words are mapped to corresponding layers in the foregoing arrangement sequence. It can be learned that, all complex-valued modulation symbols of the code word 1 are mapped to the first layer, all complex-valued modulation symbols of the code word 2 are mapped to the second layer, all complex-valued modulation symbols of the code word 3 are mapped to the third layer, and all complex-valued modulation symbols of the code word 4 are mapped to the fourth layer. In this case, multiple duplicates of a same code word undergo a relatively small channel difference, and a diversity receiving effect is also relatively poor. By comparison between FIG. 5, FIG. 6, and FIG. 7, it can be learned that, after the layer permutation mapping is performed in the manner provided in this embodiment, all complex-valued modulation symbols of each code word are evenly mapped to four transport layers.

It can be learned from the foregoing description that an l×l matrix used by $M_{symb}$ complex-valued modulation symbols of each code word or each data stream is separately determined, and layer permutation mapping is performed on the $M_{symb}$ complex-valued modulation symbols of each code word or each data stream by using the determined l×l matrix. Because the l×l matrix is one of an l×l identity matrix and a circulant matrix of the l×l identity matrix, $M_{symb}$ complex-valued modulation symbols of one code word or one data stream are separately mapped to different transport layers according to an arrangement rule of elements in the matrix by using such an l×l matrix, so that the $M_{symb}$ complex-valued modulation symbols of the code word or the data stream are scattered at multiple transport layers. Therefore, a time-frequency diversity is obtained by means of channel encoding, and a spatial diversity gain is further obtained for each code word or each data stream, thereby increasing a time-frequency spatial diversity gain, and further improving system transmission efficiency.

A person skilled in the art should understand that the embodiments may be provided as a method, a system, or a computer program product. Therefore, the present embodiments may use a form of hardware only embodiments, software only embodiments, or embodiments with a combination of software and hardware. Moreover, the present embodiments may use a form of a computer program product that is implemented on one or more computer-usable storage media (including but not limited to a disk memory, a CD-ROM, an optical memory, and the like) that include computer-usable program code.

The present embodiments are described with reference to the flowcharts and/or block diagrams of the method, the device (system), and the computer program product according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments have been described, a person skilled in the art can make changes and modifications to these embodiments once the basic inventive concept is learnt. Therefore, the following claims are intended to be construed as to cover the preferred embodiments and all changes and modifications falling within the scope of the present embodiments.

Obviously, a person skilled in the art can make various modifications and variations to the present embodiments without departing from the scope of the present embodiments. The present embodiments are intended to cover these modifications and variations provided that they fall within the scope of protection defined by the following claims and their equivalent technologies.

What is claimed is:

1. A data processing apparatus, comprising:
 a processor; and
 a non-transitory computer readable storage medium storing a program for execution by the processor, the program including instructions to:
 input q data streams, wherein each data stream comprises $M_{symb}$ complex-valued modulation symbols, wherein q and $M_{symb}$ are integers greater than or equal to 1;
 determine an l×l matrix used by the $M_{symb}$ complex-valued modulation symbols, wherein the l×l matrix is one of an l×l identity matrix and a circulant matrix of the l×l identity matrix, and l is a quantity of transport layers; and perform, using the determined l×l matrix, mapping on the $M_{symb}$ complex-valued modulation symbols.

2. The data processing apparatus according to claim 1, wherein the instructions further comprise instructions to:

determine, for the $M_{symb}$ complex-valued modulation symbols according to information selected from the group consisting of frequency-domain information corresponding to the complex-valued modulation symbols, time-domain information corresponding to the complex-valued modulation symbols, and time-frequency information corresponding to the complex-valued modulation symbols, an index number of the l×l matrix used by the complex-valued modulation symbols.

3. The data processing apparatus according to claim 2, wherein the instructions further comprise instructions to:

determine, for the $M_{symb}$ complex-valued modulation symbols, an index number of the l×l matrix used by the complex-valued modulation symbols, according to:

$$j = \left\lceil \frac{i}{g} \right\rceil \bmod l;$$

or $$j = \left\lfloor \frac{i}{g} \right\rfloor \bmod l;$$

and wherein j indicates an index number of an l×l matrix used by a complex-valued modulation symbol whose index number is i, i indicates the index number of the complex-valued modulation symbol, g indicates a quantity of resource elements in one resource group, $\lceil \bullet \rceil$ indicates rounding up, $\lfloor \bullet \rfloor$ indicates rounding down, and mod indicates a modulo operation.

4. The data processing apparatus according to claim 3, wherein the instructions further comprise instructions to:

determine, for the $M_{symb}$ complex-valued modulation symbols, an index number of the l×l matrix used by the complex-valued modulation symbols, according to:

$$j = i \bmod l;$$ and wherein j indicates an index number of an l×l matrix used by a complex-valued modulation symbol whose index number is i, i indicates the index number of the complex-valued modulation symbol, and mod indicates a modulo operation.

5. The data processing apparatus according to claim 3, wherein the instructions further comprise instructions to:

determine, for the $M_{symb}$ complex-valued modulation symbols, an index number of the l×l matrix used by the complex-valued modulation symbols, according to:

$$j = t_i \bmod l;$$ and wherein j indicates an index number of an l×l matrix used by a complex-valued modulation symbol whose index number is i, $t_i$ indicates an index number of a time-domain resource to which the complex-valued modulation symbol whose index number is i is mapped, and mod indicates a modulo operation.

6. The data processing apparatus according to claim 3, wherein the instructions further comprise instructions to:

determine, for the $M_{symb}$ complex-valued modulation symbols, an index number of the l×l matrix used by the complex-valued modulation symbols, according to:

$$j = \left( \left\lceil \frac{i}{g} \right\rceil + t_i \right) \bmod l;$$

or $$j = \left( \left\lfloor \frac{i}{g} \right\rfloor + t_i \right) \bmod l;$$

and wherein j indicates an index number of an l×l matrix used by a complex-valued modulation symbol whose index number is i, i indicates the index number of the complex-valued modulation symbol, g indicates a quantity of resource elements comprised in one resource group, $\lceil \bullet \rceil$ indicates rounding up, indicates rounding down, $\lfloor \bullet \rfloor$ indicates an index number of a time-domain resource to which the complex-valued modulation symbol whose index number is i is mapped, and mod indicates a modulo operation.

7. The data processing apparatus according to claim 1, wherein the instructions further comprise instructions to:

partition a transport block scheduled in one scheduling period into q sub transport blocks;

separately partition the q sub transport blocks and add cyclic redundancy check (CRC) codes to the q sub transport blocks to obtain q code blocks, wherein the transport block is a data packet scheduled by a Media Access Control (MAC) layer; and separately encode the q code blocks to obtain the q code words, wherein the q code words are in a one-to-one correspondence with q data streams.

8. The data processing apparatus according to claim 7, wherein the instructions further comprise instructions to:

partition the transport block into q sub transport blocks in response to one transport block being scheduled in one scheduling period; and partition one of Y transport blocks into Y1 sub transport blocks, in response to the Y transport blocks being scheduled in one scheduling period, and use remaining transport blocks as one sub transport block, wherein Y1=q−Y+1, and wherein Y is an integer greater than 1 and less than or equal to q.

9. A method, comprising:

inputting, by a data processing apparatus, q data streams, wherein each data stream comprises $M_{symb}$ complex-valued modulation symbols of one code word, and wherein q and $M_{symb}$ are integers greater than or equal to 1;

determining an l×l matrix used by the $M_{symb}$ complex-valued modulation symbols, wherein the l×l matrix is one of an l×l identity matrix and a circulant matrix of the l×l identity matrix, and l is a quantity of transport layers; and performing, using the determined l×l matrix, layer permutation mapping on the $M_{symb}$ complex-valued modulation symbols.

10. The method according to claim 9, wherein determining the l×l matrix used by the $M_{symb}$ complex-valued modulation symbols comprises:

determining, for the $M_{symb}$ complex-valued modulation symbols, according to information selected from the group consisting of frequency-domain information corresponding to the complex-valued modulation symbols, time-domain information corresponding to the complex-valued modulation symbols, and time-frequency information corresponding to the complex-valued modulation symbols, an index number of the l×l matrix used by the complex-valued modulation symbols.

11. The method according to claim 10, wherein determining the l×l matrix used by the $M_{symb}$ complex-valued modulation symbols comprises:

determining, for the $M_{symb}$ complex-valued modulation symbols, an index number of the l×l matrix used by the complex-valued modulation symbols according to:

$$j = \left\lceil \frac{i}{g} \right\rceil \bmod l$$

or $$j = \left\lfloor \frac{i}{g} \right\rfloor \bmod l;$$

and wherein j indicates an index number of an l×l matrix used by a complex-valued modulation symbol whose index number is i, i indicates the index number of the complex-valued modulation symbol, g indicates a quantity of resource elements comprised in one resource group, $\lceil \bullet \rceil$ indicates rounding up, $\lfloor \bullet \rfloor$ indicates rounding down, and mod indicates a modulo operation.

12. The method according to claim 10, wherein determining the l×l matrix used by the $M_{symb}$ complex-valued modulation symbols comprises:

determining, for the $M_{symb}$ complex-valued modulation symbols, an index number of the l×l matrix used by the complex-valued modulation symbols, according to:

$j = i \bmod l$; and wherein j indicates an index number of an l×l matrix used by a complex-valued modulation symbol whose index number is i, i indicates the index number of the complex-valued modulation symbol, and mod indicates a modulo operation.

13. The method according to claim 10, wherein determining the l×l matrix used by the $M_{symb}$ complex-valued modulation symbols comprises:

determining, for the $M_{symb}$ complex-valued modulation symbols, an index number of the l×l matrix used by the complex-valued modulation symbols, according to:

$j = t_i \bmod l$; and wherein j indicates an index number of an l×l matrix used by a complex-valued modulation symbol whose index number is i, $t_i$ indicates an index number of a time-domain resource to which the complex-valued modulation symbol whose index number is i is mapped, and mod indicates a modulo operation.

14. The method according to claim 10, wherein determining the l×l matrix used by the $M_{symb}$ complex-valued modulation symbols comprises:

determining, for the $M_{symb}$ complex-valued modulation symbols, an index number of the l×l matrix used by the complex-valued modulation symbols, according to:

$$j = \left(\left\lceil \frac{i}{g} \right\rceil + t_i\right) \bmod l$$

or $$j = \left(\left\lfloor \frac{i}{g} \right\rfloor + t_i\right) \bmod l;$$

and wherein j indicates an index number of an l×l matrix used by a complex-valued modulation symbol whose index number is i, i indicates the index number of the complex-valued modulation symbol, g indicates a quantity of resource elements comprised in one resource group, $\lceil \bullet \rceil$ indicates rounding up, indicates rounding down, $\lfloor \bullet \rfloor$ indicates an index number of a time-domain resource to which the complex-valued modulation symbol whose index number is i is mapped, and mod indicates a modulo operation.

15. The method according to claim 9, further comprising:

partitioning a transport block scheduled in one scheduling period into q sub transport blocks, and separately partitioning the q sub transport blocks and adding cyclic redundancy check (CRC) codes to the q sub transport blocks to obtain q code blocks, wherein the transport block is a data packet scheduled by a Media Access Control (MAC) layer; and separately encoding the q code blocks to obtain q code words, wherein the q code words are in a one-to-one correspondence with the q data streams, before inputting the q data streams.

16. The method according to claim 15, wherein partitioning the transport block scheduled in one scheduling period into q sub transport blocks comprises:

partitioning the transport block into q sub transport blocks, in response to one transport block being scheduled in one scheduling period; and partitioning one of Y transport blocks into Y1 sub transport blocks, in response to Y transport blocks being scheduled in one scheduling period, and using remaining transport blocks as one sub transport block, wherein Y1=q-Y+1, and wherein Y is an integer greater than 1 and less than or equal to q.

17. A non-transitory computer readable storage medium storing a program for execution by a processor, the program including instructions to:

input q data streams, wherein each data stream comprises $M_{symb}$ complex-valued modulation symbols, wherein q and $M_{symb}$ are integers greater than or equal to 1;

determine an l×l matrix used by the $M_{symb}$ complex-valued modulation symbols, wherein the l×l matrix is one of an l×l identity matrix and a circulant matrix of the l×l identity matrix, and l is a quantity of transport layers; and perform, using the determined l×l matrix, mapping on the $M_{symb}$ complex-valued modulation symbols.

* * * * *

UNITED STATES PATENT AND TRADEMARK OFFICE
CERTIFICATE OF CORRECTION

| | |
|---|---|
| PATENT NO. | : 9,893,782 B2 |
| APPLICATION NO. | : 15/444609 |
| DATED | : February 13, 2018 |
| INVENTOR(S) | : Huang |

It is certified that error appears in the above-identified patent and that said Letters Patent is hereby corrected as shown below:

In the Claims

In Column 30, Lines 19-20, Claim 6, delete "$\lceil \bullet \rceil$ indicates rounding up, indicates rounding down, $\lfloor \bullet \rfloor$ indicates an index number" and insert --$\lceil \bullet \rceil$ indicates rounding up, $\lfloor \bullet \rfloor$ indicates rounding down, $t_i$ indicates an index number--.

In Column 32, Lines 19-20, Claim 14, delete "$\lceil \bullet \rceil$ indicates rounding up, indicates rounding down, $\lfloor \bullet \rfloor$ indicates an index number" and insert --$\lceil \bullet \rceil$ indicates rounding up, $\lfloor \bullet \rfloor$ indicates rounding down, $t_i$ indicates an index number--.

Signed and Sealed this
Fifteenth Day of May, 2018

Andrei Iancu
*Director of the United States Patent and Trademark Office*